(12) United States Patent
Lee

(10) Patent No.: US 7,418,280 B2
(45) Date of Patent: Aug. 26, 2008

(54) MOBILE TERMINAL HAVING RETRACTABLE CAMERA

(75) Inventor: Choong Jae Lee, Uiwang (KR)

(73) Assignee: LG Electronics Inc., Seoul (KR)

( * ) Notice: Subject to any disclaimer, the term of this patent is extended or adjusted under 35 U.S.C. 154(b) by 575 days.

(21) Appl. No.: 10/607,551

(22) Filed: Jun. 27, 2003

(65) Prior Publication Data

US 2004/0097262 A1 May 20, 2004

(30) Foreign Application Priority Data

Nov. 18, 2002 (KR) ...................... 10-2002-0071615

(51) Int. Cl.
*H04M 1/00* (2006.01)
*H04B 1/38* (2006.01)

(52) U.S. Cl. ................. 455/575.3; 455/550.1; 455/90.3
(58) Field of Classification Search ............. 455/550.1, 455/575.1, 90.3, 575.3, 556.1, 556.2, 557; 379/433.01, 433.3, 433.04
See application file for complete search history.

(56) References Cited

U.S. PATENT DOCUMENTS

| 5,491,507 | A | * | 2/1996 | Umezawa et al. | ........ 348/14.02 |
|---|---|---|---|---|---|
| 6,069,648 | A | * | 5/2000 | Suso et al. | ................ 348/14.02 |
| 6,396,924 | B1 | * | 5/2002 | Suso et al. | ............. 379/433.13 |
| 6,532,035 | B1 | * | 3/2003 | Saari et al. | ................ 348/14.02 |
| 6,697,117 | B1 | * | 2/2004 | Park | ............................ 348/373 |
| 6,704,586 | B2 | * | 3/2004 | Park | ......................... 455/575.3 |
| 6,839,576 | B2 | * | 1/2005 | Aagaard et al. | ........... 455/575.1 |
| 6,865,406 | B2 | * | 3/2005 | Park | ......................... 455/575.3 |
| 6,879,337 | B2 | * | 4/2005 | Tatehana et al. | .......... 348/14.02 |
| 6,882,726 | B2 | * | 4/2005 | Kim | ...................... 379/433.13 |
| 6,975,273 | B1 | * | 12/2005 | Choi | ........................... 343/702 |
| 6,999,802 | B2 | * | 2/2006 | Kim | ......................... 455/575.1 |
| 7,133,691 | B2 | * | 11/2006 | Kang | ....................... 455/556.1 |
| 7,136,653 | B2 | * | 11/2006 | Lemke | ......................... 455/448 |
| 7,146,200 | B2 | * | 12/2006 | Park et al. | ................. 455/575.3 |
| 7,242,975 | B2 | * | 7/2007 | Bae et al. | .................. 455/575.3 |
| 2002/0187818 | A1 | * | 12/2002 | Kang | ........................... 455/575 |
| 2003/0162509 | A1 | * | 8/2003 | Bae et al. | ....................... 455/90 |

* cited by examiner

*Primary Examiner*—Tilahun B Gesessse
(74) *Attorney, Agent, or Firm*—Ked & Associates, LLP

(57) ABSTRACT

A camera for generating an image signal, and a camera installing part for installing said camera in a folder or a body portion of a mobile terminal is provided. The camera is configured to protrude out of the camera installing part when the folder is unfolded, and to be retracted into the camera installing part when the folder is folded. The camera installing part may be disposed in a hinge part for coupling the folder and the body portions of the mobile terminal.

32 Claims, 7 Drawing Sheets

MOBILE TERMINAL HAVING RETRACTABLE CAMERA

BACKGROUND OF THE INVENTION

1. Field of the Invention

The present invention relates to a mobile communication terminal having a camera, and more particularly, to a terminal having a camera module received in a camera case.

2. Background of the Related Art

Recently, mobile communication terminals having cameras installed therein to transmit/receive image information have been developed. One type is a fixed type camera fixed to a case, another type is a rotary type camera, as shown in FIG. 1, installed to revolve at a portion of a folder 3 coupled with a body 4. The fixed type camera, according to a related art, can adjust its viewing angle by moving the entire camera, while the rotary type camera can be rotated to a suitable angle to take a picture of an image.

In a terminal such as module 1 of FIG. 1, which includes a camera exposed externally, the camera is exposed externally regardless of whether a terminal 100 of the camera is used or not. Therefore, a lens 2 of the camera is vulnerable to dirt or particles, as well as, physical abuse that can lead to damage or breakage.

The above references are incorporated by reference herein where appropriate for appropriate teachings of additional or alternative details, features and/or technical background.

SUMMARY OF THE INVENTION

Accordingly, the present invention is directed to a mobile communication terminal having a camera that substantially obviates one or more of the problems due to limitations and disadvantages of the related art.

An object of the present invention is to provide a mobile communication terminal having a camera with less vulnerability of the lens to contamination or damage.

To achieve these and other advantages in whole or in part, and in accordance with the purpose of the present invention as embodied and broadly described, a mobile communication terminal having a camera according to the present invention includes a camera for generating an image signal, and a camera installing part for installing said camera in the folder or the body, wherein the camera protrudes out of the camera installing part when the folder is unfolded, and the camera is inserted into the camera installing part when the folder is folded. Additionally, the camera installing part may be formed in a hinge part for coupling the folder and the body.

The hinge part may include a folder hinge part and a body hinge part, where the hinge part can receive the camera therein, wherein the camera is received in the hinge part, wherein the camera protrudes out of the hinge part when the folder is unfolded, and wherein the camera is inserted in a camera receiving space inside the hinge part when the folder is folded.

Preferably, the camera includes a camera module having a lens and an electronic circuit inserted therein and a camera shaft coupled with the camera module with the camera shaft interoperating with the folder hinge part. More preferably, the camera module is coupled with the camera shaft to turn against the camera shaft.

Preferably, a diameter of the camera shaft is smaller than that of a penetrating hole formed in the camera module, a hooking ring sill is formed at one side end of the camera shaft, a snap ring locking groove is formed inside the hooking ring sill, an end sill having a diameter smaller than the hooking ring sill of the camera shaft is formed at the camera module, and a snap ring is coupled with the snap ring locking groove so that the camera shaft fitted in the camera module is not released easily from the camera module.

Preferably, a plurality of snap recesses is formed at a side end of the camera module and a plurality of snap protrusions are formed at the snap ring and the snap recesses are locked in the snap protrusions to require a great turning force whenever the module is revolved at a predetermined angle.

Preferably, a driving pin is formed at the hinge part to protrude inward, a guide groove is formed at a circumference of the camera shaft to lock the driving pin therein, and the driving pin is coupled with the guide groove to move the camera shaft in a horizontal direction when the folder is revolved in a vertical direction.

Preferably, a hook having both sides bisected is formed like an elastic body at an end of the camera shaft, a hooking ring sill is formed on an inner circumference of the hinge part to protrude inward, and the hook is caught on the hooking ring sill so that the camera shaft inserted in the hinge part is not easily released from the hinge part.

Preferably, a straight guide groove is formed at one side of the camera shaft in a shaft length direction, a straight sliding rib is formed on an inner circumference of the hinge part, and the sliding rib is locked in the guide groove to guide the camera shaft to move straight when the camera shaft is inserted in the hinge part.

Preferably, a straight sliding rib is formed at one side of the camera shaft in a shaft length direction, a straight guide groove is formed on an inner circumference of the hinge part, and the sliding rib is locked in the guide groove to guide the camera shaft to move straight when the camera shaft is inserted in the hinge part.

Preferably, a pair of driving pins is formed at the hinge part and a pair of guide grooves are formed at the camera shaft. More preferably, a camera case is additionally formed next to the hinge part.

To further achieve these and other advantages in whole or in part, and in accordance with the purpose of the present invention as embodied and broadly described, a mobile communication terminal, including a first body part, a second body part, a hinge part connecting the first body part and the second body part, a rotating camera holder enclosed in the hinge part, and a camera in the rotating camera holder, body part are at a first body part and the second body part are at a first predetermined angle relative to another, the camera protrudes from the camera holder, and wherein when the first body part and the second body part are at a second predetermined angle relative to one another, the camera is embedded within the camera holder.

To further achieve these and other advantages in whole or in part, and in accordance with the purpose of the present invention as embodied and broadly described, a hinge camera, including a first part, a second part, a hinge connecting the first part of the second part, a rotating camera holder in the hinge, and a camera in the rotating camera holder, wherein the camera includes a camera lens, and wherein the camera lens is enclosed in the rotating camera holder at a first predetermined angle and is exposed from the rotating camera holder at a second predetermined angle.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In a terminal including a folder and a body, a preferred embodiment of the present invention is characterized in that a camera can be installed in a mobile terminal or appropriate device where the camera lens is only employed and exposed when the mobile terminal is in a predetermined configuration. Preferably, a camera is shielded when retracted within a mobile terminal when the mobile terminal is closed. The camera can be retracted in a hinge part of a mobile terminal when the mobile terminal is closed and therefore the camera can be protected within the hinge part of the mobile terminal.

In order to achieve the retraction, a preferred embodiment of a mobile terminal of the present invention preferably includes a folder part connected to a body case where a moving the folder part causes a camera to retract. This is done by causing the lens to be inserted in a camera-receiving space inside the hinge part, when the folder part is folded toward the body case. The camera can be also made to protrude from the mobile terminal to take pictures. In a preferred embodiment of the present invention, the camera lens can protrude out of the hinge part when the folder part is unfolded away from the body case.

Figure 7:
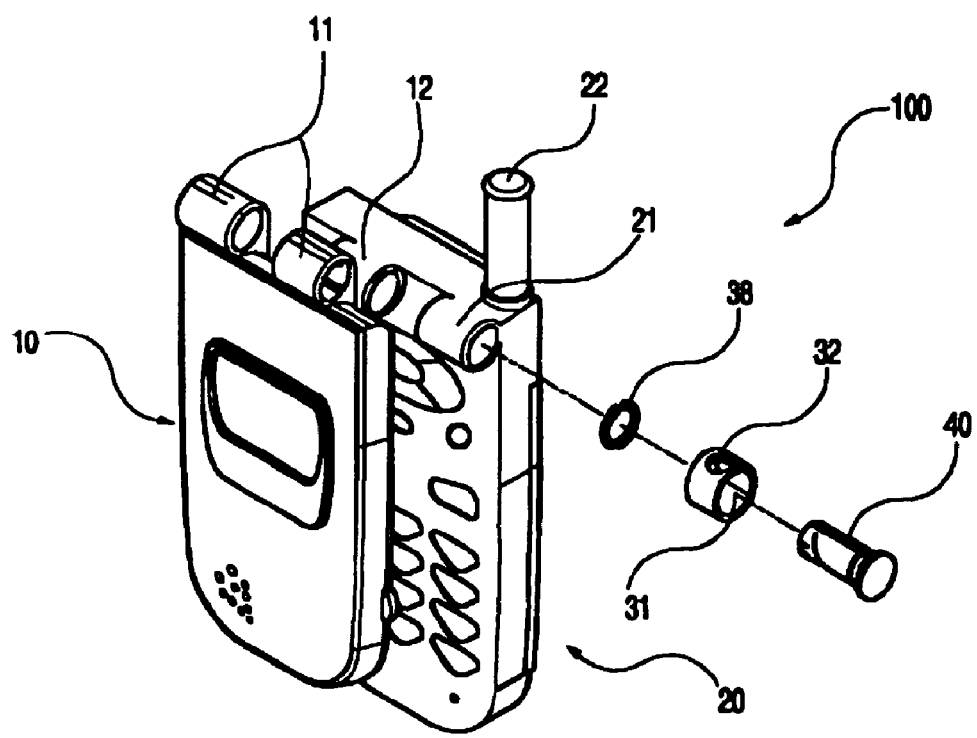
FIG. 7 illustrates a disassembled terminal for explaining that a camera module is fitted in a camera case according to a preferred embodiment of the present invention.

A cylindrical hinge part, as shown in FIG. 7, can be used to couple a folder 10, which can include an LCD or other display with a body case 20, which may include a keypad and electronic circuits, etc., installed therein. This cylindrical hinge part may have a space or partition for receiving a camera 30 therein.

In order for the space in the hinge part to receive the camera therein, as well as, to couple the folder with the body case, a folder hinge part 11 formed at the folder part is coupled with a body hinge part 12 at the body case. These hinge parts 11, 12 enable the folder part to revolve at a predetermined angle from the body, preferably within about 180° to provide stability. The folder hinge part 11 and the body hinge part 12 may have cylindrical or other usable predetermined shapes (e.g., hollow) so as to provide spaces to receive a camera shaft 40 and a camera module 31 preferably therein.

A camera case 21 having a size similar to or larger than the folder hinge part 11 or the body hinge part 12 can also be formed, preferably next to the body hinge on the body case. Alternately, the body or folder hinge parts 12, 11 or any other protective unit could be adapted to house a camera and provide the attributes of the camera case 21. The camera case 21 or other protective unit, as mentioned above, can be used to protect the camera from any external forces or contaminants.

Additionally, a received type camera 30 having a cylindrical or other usable predetermined shape may preferably be installed to allow the camera to be useable, preferably by protruding, when the folder is unfolded. Also, when the folder 10 is unfolded and revolved away from the body to use the mobile terminal, the camera 30 received in the camera case 21 can be made to protrude externally or otherwise be uncovered when the folder is revolved.

Figure 1:
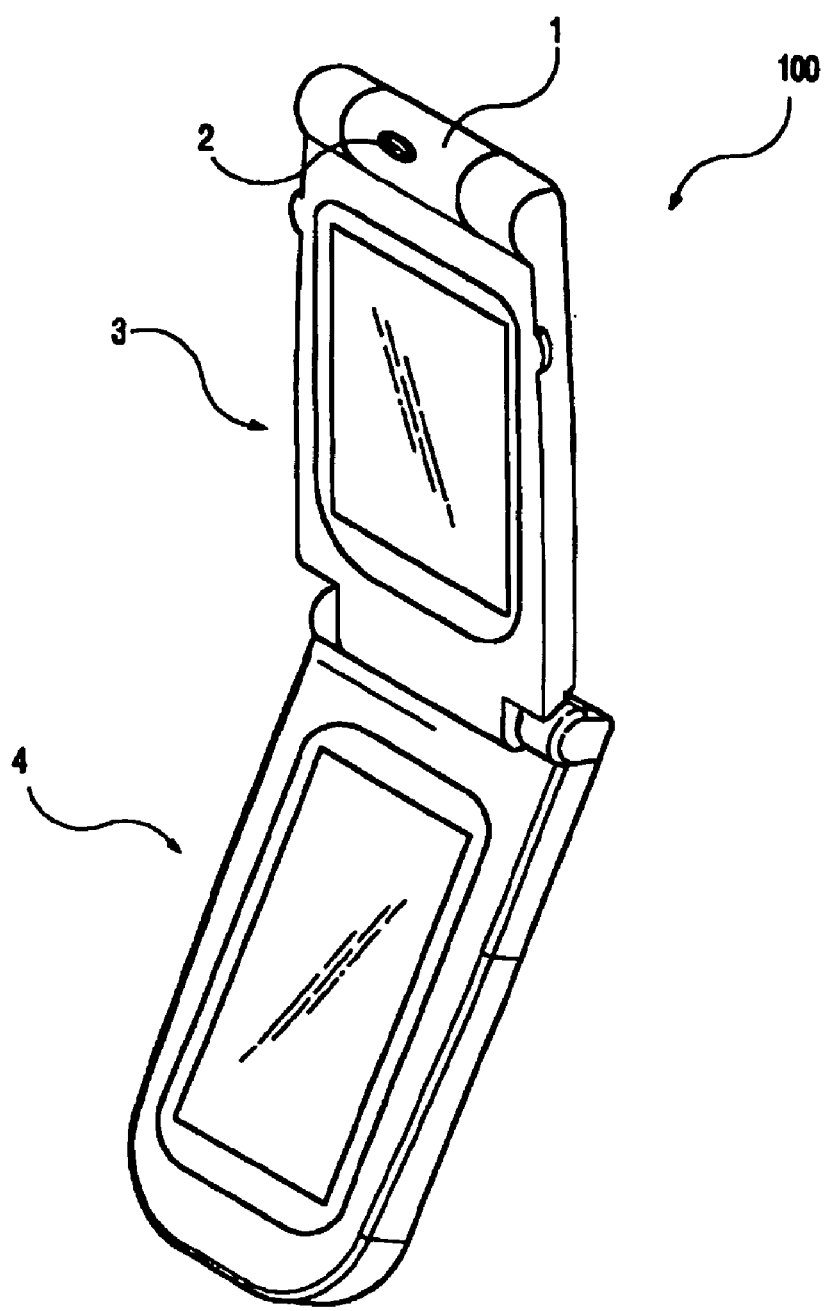
FIG. 1 illustrates a mobile communication terminal having a camera according to a related art.
Figure 2A:
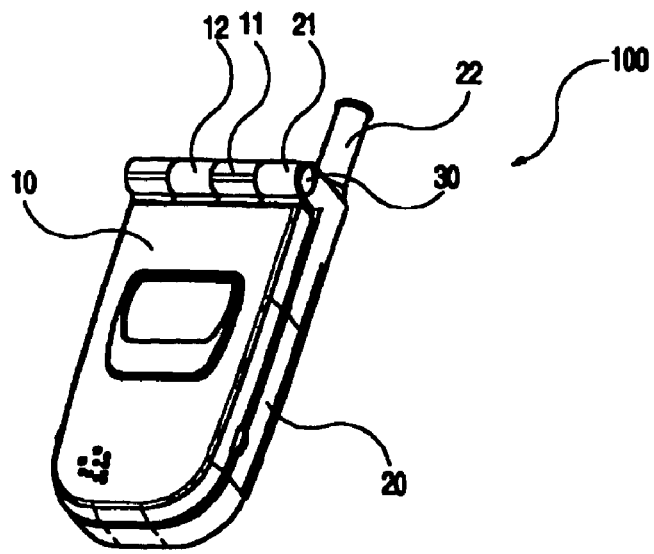
FIGS. 2a to 2c illustrate mobile communication terminal having a camera according to a preferred embodiment of the present invention for showing opening states of a folder.
Figure 2B:
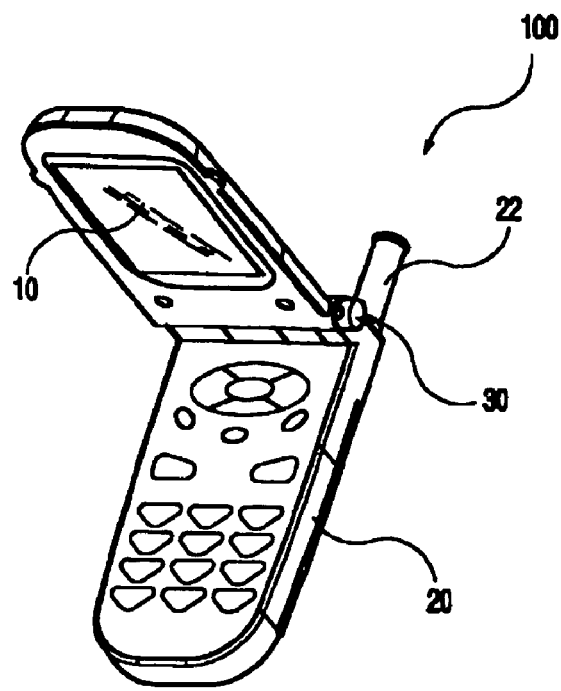
Figure 2C:
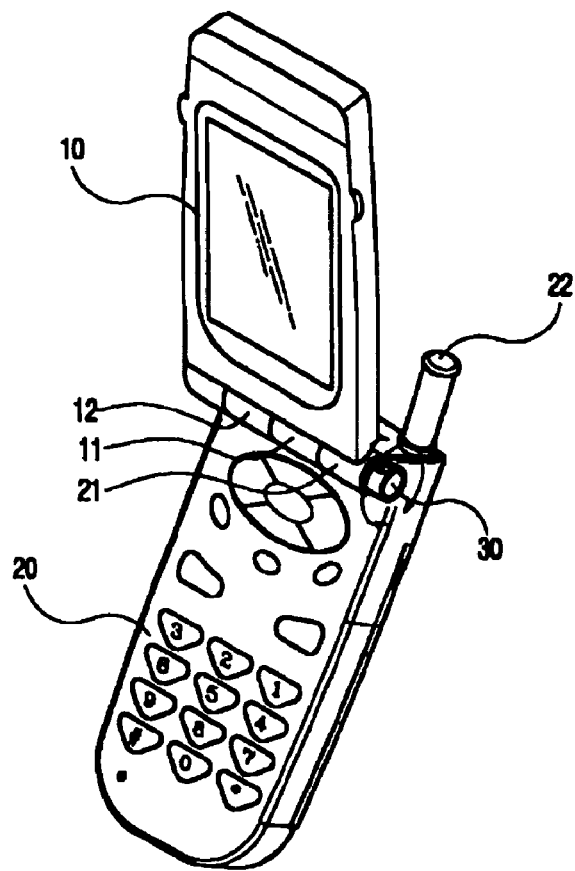
Figure 3A:
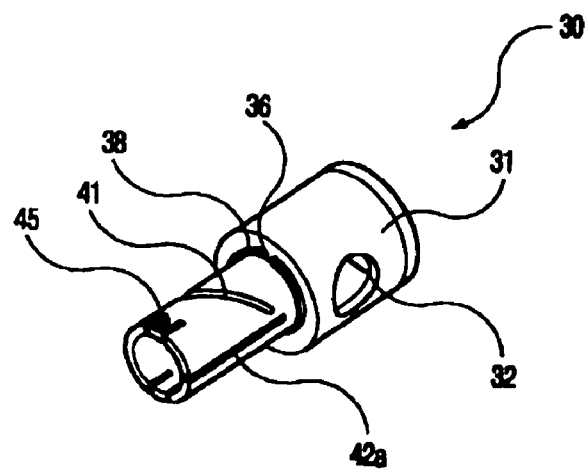
FIGS. 3a to 3c illustrate camera module according to a preferred embodiment of the present invention.
Figure 3B:
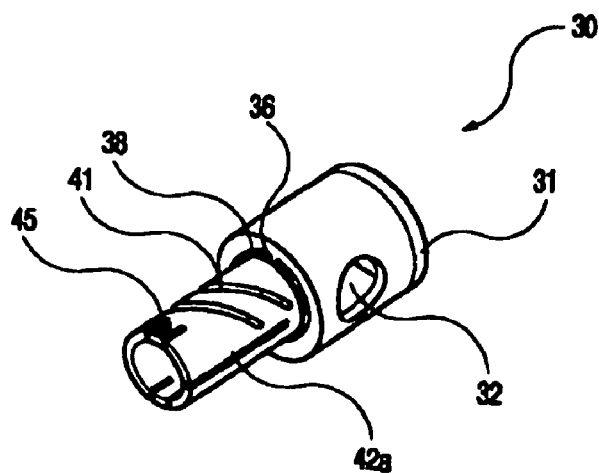
Figure 3C:
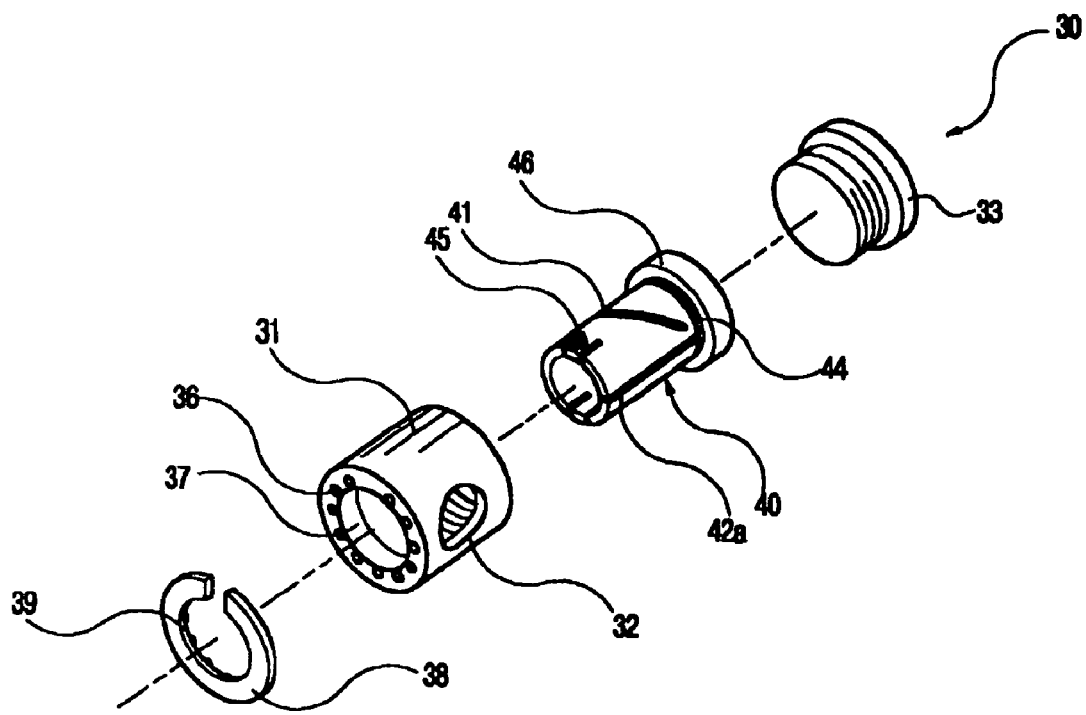

As illustrated in FIG. 3a, a preferred embodiment of the camera 30 includes a cylindrical or other usable shaped (hereinafter "cylindrical") camera module 31 and a cylindrical or corresponding usable shaped camera shaft 40, as illustrated in FIG. 3b, where the camera shaft 40 has a diameter smaller than that of the camera module 31. Next, as illustrated in FIG. 3c, the camera shaft 40 may preferably be fitted in the camera module 31 or in a similar type of compartment, and a snap ring 38 may preferably be used to hold the camera module 31 and the camera shaft 40 together. It is noted, however, that the snap ring may not be necessary if the camera shaft 40 can be fitted to remain within the camera module 31 without the snap ring 38. Alternately, other rings or devices may be used to hold the camera shaft 40 in the camera module 31, such as screw on rings, elastomeric rings, shrink fit rings or clamp type devices.

Namely, as illustrated in FIG. 3c, the camera shaft 40 may preferably be locked into place in the camera module 31. The locking can occur by first fitting the camera shaft 40 in the camera module 31. Next, a hooking ring sill 46, formed at an end of one side of the camera shaft 40, can be fit on to an end sill part 37 so that it can protrude like a ring shape inward from a side end of the corresponding to camera module 31. Next, a snap ring 38 may be inserted in a snap ring locking groove 44 formed at the camera shaft 40 to hold the snap ring 38, and thus the camera shaft 40 and the camera module 31 can be locked together.

It is important to note that the camera shaft 40 may preferably be fitted into the circumference of the camera module 31 and therefore the camera shaft 40 should preferably have an outer diameter smaller than that of the inner diameter of the camera module 31. Hence, the diameters of the camera shaft 40 and the camera module 31 should be sized such that the camera shaft 40 can move and turn within the camera module 31 as needed.

Additionally, a plurality of snap recesses 36 may preferably be formed, as illustrated in FIG. 3c, at a side end of the camera module 31 with a matching plurality of snap protrusions 39 on the snap ring 38. The snap recesses 36 in combination with the snap protrusions 39 may preferably be used to maintain a predetermined amount of angle spacing between the camera module 31 and the camera shaft 40. Hence, the camera module 31 may be set at predetermined angles with the camera shaft 40 by rotating, as well as toggling or clicking through multiple predetermined settings of the snap recesses 36 and the snap protrusions 39. It is noted that the snap recesses 36 and the snap protrusions 39 may also be useful for holding the camera module 31 in particular settings at predetermined angles and minimizing any slipping in positions there between.

After the camera shaft 40 is locked in the camera module 31, a camera lens 32, or other image capturing device, and electronic circuits for image gain may also be installed in the camera module 31. Preferably, a cover 33, as illustrated in FIG. 3c, can then also be coupled with the camera module 31 to protect the camera module 31. More preferably, the cover 33 can be coupled to the camera 30 by any coupling device, such as a screw type (shown in the drawing), a forcible fitting type, a fully sealing type, or the like.

Figure 4:
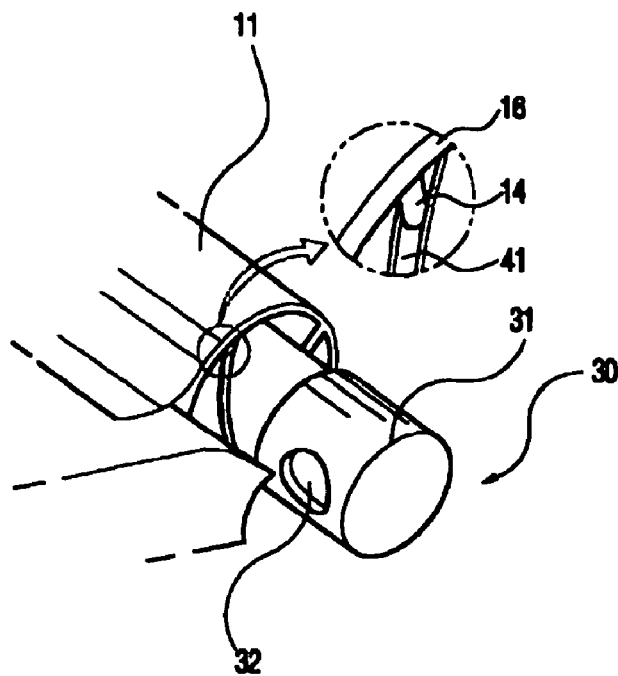
FIG. 4 illustrates a camera protruding from a camera case of a terminal according to a preferred embodiment of the present invention.

A driving pin 14, as illustrated in FIG. 4, slot device or the like may preferably be provided in the folder hinge part 11 to aid in moving the camera 30 within the folder and body hinge parts 11, 12 and thus cause the camera 30 to retract when the mobile terminal is closed or protrude when the mobile terminal is opened. Within the folder hinge part 11, an inclined guide groove 41 can be formed preferably at a circumference of the camera shaft 40 as to allow the driving pin 14 to be fitted therein. The driving pin 14 may then preferably be fitted in the guide groove 41 to provide a cam in the folder hinge part 11. As such, when folder 10 is turned in a vertical direction, the camera 30 would then be able to move in a horizontal direction and be exposed outside of the hinge parts 11, 12 and the camera case 21 (as illustrated in FIG. 7).

A hook 45, as illustrated in FIGS. 3b and 3c, having both sides bisected is preferably provided and formed with an elastic material at an end of the camera shaft 40, where a hooking ring sill 16, as illustrated in FIG. 4, is also preferably provided and formed at an inner circumference of the folder hinge part 11 to protrude inward. Hence, once the camera shaft 40 is inserted in the folder hinge part 11, the hook 45 can be fitted into the hooking ring sill 16 to secure the fitting.

Figure 5A:
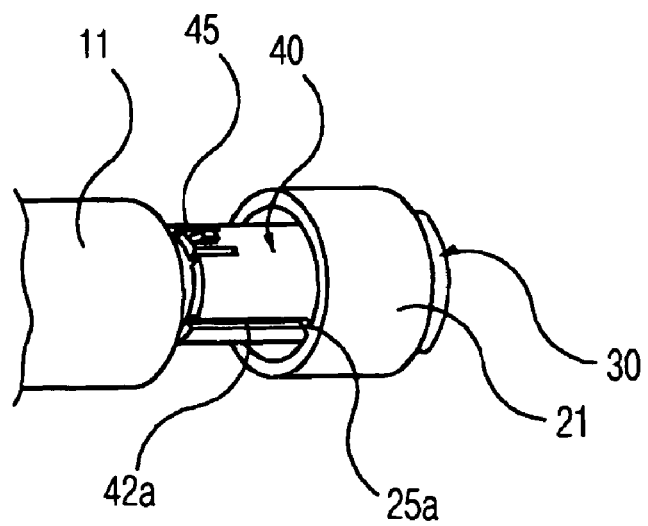
FIG. 5a and FIG. 5b illustrate received type cameras fitted into camera cases according to a preferred embodiment of the present invention, respectively.
Figure 5B:
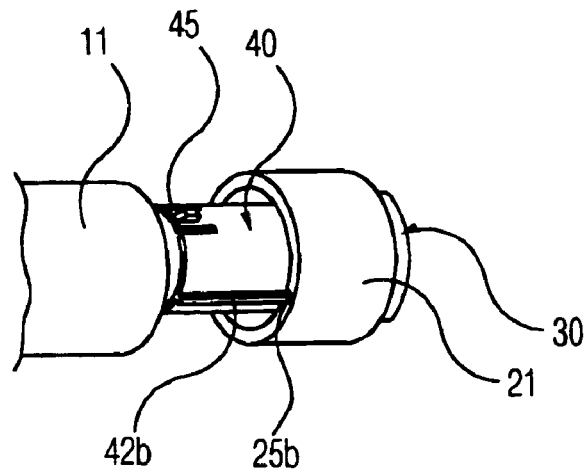
Figure 6A:
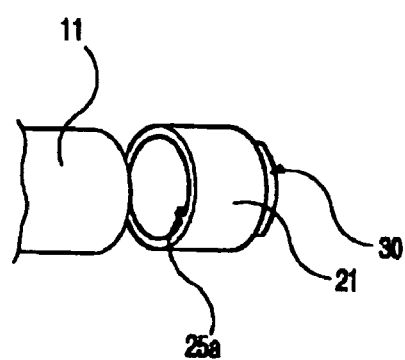
FIG. 6a and FIG. 6b illustrate guide protrusions of camera cases according to a preferred embodiment of the present invention, respectively.

A straight guide groove 42a, as illustrated in FIG. 5a, is also preferably provided and formed at one side of the camera shaft 40 in a shaft length direction. Also, a straight sliding rib 25a, as illustrated in FIGS. 5a and 6a, is preferably provided and formed on an inner circumference of the body hinge part 12 or the camera case 21 (as illustrated in FIGS. 5a, 5b, 6a, 6b, and 7) depending upon whether a separate camera case 21 is provided or if the body hinge part 12 is used to house the camera module 31. When the camera shaft 40 is inserted in the camera case 21, as illustrated in FIG. 5a, the straight sliding rib 25a can then be fitted into the straight guide groove 42a of the camera shaft 40 to guide the movement of the camera shaft 40 in the camera case 21.

Next, as illustrated in FIG. 4, the driving pin 14 protruding inside the folder hinge part 11 can preferably be fitted in the inclined guide groove 41 of the camera shaft 40. It is noted that the inclined guide groove 41 can be replaced with the screw type guide groove, as needed. Hence, when the folder 10 is unfolded, the driving pin 14 can then slide along the inclined guide groove 41. Since such a sliding operation moves the camera shaft 40, the camera module 31 coupled with the camera shaft 40 could then be forced to protrude out of the camera case 21 externally to position the camera lens 32 in a position appropriate for taking pictures of an object.

In this case, as illustrated in FIG. 5a, the camera shaft 40 moves on a straight line by the straight guide groove 42a traversing across the shaft 40 and the straight sliding rib 25a. If the folder is opened completely, the hook 45 at the end of the camera shaft 40 gets closer to the hooking ring sill 16, where at a certain predetermined angle, the camera shaft 40 cannot protrude any further as the hook 45 is stopped against the hooking ring sill 16.

Figure 6B:
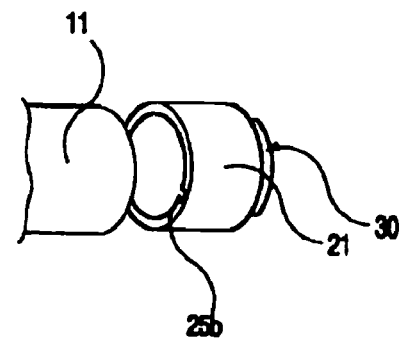

In order to guide the movement of the camera shaft 40, unlike the above-explained embodiment of the present invention, another embodiment can be used. In this second embodiment, the straight sliding rib 25a and the straight guide groove 42a, as shown in FIGS. 5a, and 6a, can be reversed. Namely, as illustrated in FIGS. 5b and 6b, a straight guide rib 42b and a sliding groove 25b are formed at the shaft 40 and the camera case 21, respectively.

Moreover, a pair of driving pins 14 may also be formed in the folder hinge part 11 and a pair of guide grooves 42a may be formed at the shaft 40, thereby further stabilizing the operation of the camera. In this case, the locations of the driving pins 14 and the guide grooves 42 can be reciprocally placed or the locations of the guide grooves/ribs 42a/b and the sliding ribs/grooves 25b/a can be used.

Accordingly, operations of the above-constituted terminal can be described as follows. As the folder 10, having been folded to the body case 20, is unfolded, the folder hinge part 11 is turned so that the driving pin 14 rotates thus causing the camera shaft 40 to move into a predetermined position. Further, as the folder 10 unfolds to move the camera shaft 40, the camera module 31 is exposed externally from the camera case 21, and eventually when the camera module 31 is at a predetermined position, the camera lens 32 becomes fully exposed externally. Once the camera lens 32 is exposed externally, the camera 30 is then able to take pictures.

Since the camera 30 and the camera lens 32 can be adjusted as the folder 10 to body case 20 angle is adjusted, a photographing angle can be adjusted arbitrarily in accordance with an object. Additionally, upon closing of the folder 10, the above-explained elements can then operate in reverse order so that the camera module 31 and the camera lens 32 can then move back into the camera case 21 to protect the camera 30 and the camera lens 32.

As described above, preferred embodiments according to the present invention house a camera coupled to reciprocating devices in a hinge area of a mobile terminal. However, the present invention is not intended to be so limited. Other locations in the mobile terminal can be used as long as reciprocal movement between first (e.g., closed) and second (e.g., open) positions of the mobile terminal are coupled to controllably extend/retract the camera.

Further, the preferred embodiments are disclosed that always direct the reciprocal movement of the mobile terminal to the corresponding camera. However, the present invention is not intended to be so limited as the reciprocal movement could be selectively coupled (e.g., directed) to extend/retract the camera so an increased portion of time is spent by the camera in a protected (e.g., retracted) position to further reduce damage. In addition, the mobile terminal can rotate to a plurality of non-closed positions whereby the camera is exposed in less than all (e.g., only one) of the non-closed positions.

Accordingly, preferred embodiments according to the present invention can have a camera module received in a camera case when in a closed position (e.g., the folder is folded), thereby protecting the camera module and camera lens from damage. Therefore, preferred embodiments according to the present invention not only protect the camera lens but also allow the camera to be conveniently used and protected.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:
1. A mobile terminal, comprising:
   a body part;
   a folder part;
   a hinge part provided where the body part and the folder part meet, wherein the folder part is configured to rotate about an axis of rotation disposed along the hinge part so as to rotate between a first and a second position relative to the body part; and a camera, wherein the camera is configured to move longitudinally along the axis of rotation so as to extend outward from the mobile terminal as the folder part moves from the second position to the first position, and to be retracted into the mobile terminal as the folder part moves from the first position to the second position.

2. The mobile terminal of claim 1, further comprising:
a camera installing part configured to install said camera in the mobile terminal, wherein the camera is configured to extend out of the camera installing part when the folder part is rotated away from the body part, and to be retracted into the camera installing part when the folder part is rotated toward the body part.

3. The mobile terminal of claim 1, wherein the camera installing part is provided with the hinge part.

4. The mobile terminal of claim 3, wherein the hinge part comprises a folder hinge part which extends from a lower end portion of the folder part, and a body hinge part which extends from an upper end portion of the body part.

5. The mobile terminal of claim 3, further comprising a camera case provided adjacent the hinge part.

6. The mobile terminal of claim 1, wherein the camera comprises:
a camera module having a lens and an electronic circuit provided therein; and
a camera shaft coupled to the camera module, wherein the camera module is configured to move as the folder part moves.

7. The mobile terminal of claim 6, wherein the camera module is coupled to the camera shaft, and wherein the camera module is configured to rotate about the camera shaft.

8. The mobile terminal of claim 6, wherein an outer diameter of the camera shaft is smaller than an inner diameter of the camera module.

9. The mobile terminal of claim 6, further comprising:
a hooking sill formed at one end of the camera shaft;
a snap ring locking groove formed on the camera shaft, at an inner circumference of the hooking sill;
an end sill formed on one end of the camera module and having a diameter smaller than the hooking sill; and
a snap ring coupled to the snap ring locking groove such that the camera shaft is not released easily from the camera module.

10. The mobile terminal of claim 6, further comprising a plurality of snap recesses formed at a side end of the camera module, and a corresponding plurality of snap protrusions formed on a snap ring configured to be positioned adjacent the side end of the camera module, wherein the plurality of snap recesses are configured to engage with the plurality of snap protrusions.

11. The mobile terminal of claim 6, further comprising:
a driving pin which protrudes inward from an inner circumferential surface of the hinge part; and
a guide groove formed along an outer circumferential surface of the camera shaft and configured to receive the driving pin therein, wherein the driving pin is configured to move along the guide groove so as to move the camera shaft in a longitudinal direction along the axis of rotation as the folder part rotates relative to the body part.

12. The mobile terminal of claim 6, further comprising:
a hook formed at an end of the camera shaft; and
a hooking ring sill formed on an inner circumference of the hinge part which protrudes inward so as to engage the hook as the camera shaft is inserted into the hinge part.

13. The mobile terminal of claim 6, further comprising:
a straight guide groove formed along an outer circumferential surface of the camera shaft and extending in a longitudinal direction thereof; and
a straight sliding rib extending outward from an inner circumferential surface of the hinge part, wherein the guide groove is configured to receive the sliding rib therein so as to guide the camera shaft as it moves relative to the hinge part.

14. The mobile terminal of claim 6, further comprising:
a straight sliding rib extending outward from an outer circumferential surface of the camera shaft along a longitudinal direction thereof; and
a straight guide groove formed along an inner circumferential surface of the hinge part, wherein the sliding groove is configured to receive the sliding rib therein so as to guide the camera shaft as it moves relative to the hinge part.

15. The mobile terminal of claim 6, further comprising:
a pair of driving pins extending inward from an inner circumferential surface of the hinge part; and
a corresponding pair of guide grooves formed on an outer circumferential surface the camera shaft.

16. The mobile terminal of claim 6, further comprising a camera case disposed adjacent the hinge part.

17. The mobile terminal of claim 1, wherein the camera is configured to be selectively extended from the terminal when the folder part is in the first position in response to a corresponding user action.

18. The mobile terminal of claim 1, wherein the camera is configured to extend outward from an outer circumferential side edge portion of the terminal when the folder part is in the first position.

19. The mobile terminal of claim 18, wherein the folder part is open relative to the body part in the first position, and closed relative to the body part in the second position.

20. A mobile terminal, comprising:
a first body part;
a second body part;
a hinge part connecting the first body part and the second body part;
a camera holder disposed in the hinge part; and
a camera disposed in the camera holder, wherein the camera is configured to move such that the camera is positioned outside of the camera holder when the first body part and the second body part are at a first predetermined angle relative to one another, and the camera is positioned within the camera holder when the first body part and the second body part are at a second predetermined angle relative to one another.

21. The mobile terminal of claim 20, wherein the camera comprises a camera lens, and wherein the camera lens is positioned within the camera holder when the first body part and the second body part are at the second predetermined angle, and wherein the camera lens is positioned outside of the camera holder when the first body part and the second body part are at the first predetermined angle.

22. The mobile terminal of claim 20, wherein the first predetermined angle is greater than the second predetermined angle.

23. The mobile terminal of claim 20, wherein the camera holder is configured to rotate, and wherein the camera is configured to be selectively moved between an interior and an exterior of the camera holder according to a user operation.

24. The mobile terminal of claim 23, further comprising:
an electronic circuit in the camera holder;

a driving pin which extends inward toward a central portion of the hinge part; and a corresponding guide groove formed in the hinge part and configured to receive the driving pin therein, wherein a movement of the driving pin within the guide groove forces at least a lens of the camera to be exposed from or enclosed in the camera holder when an angle between the first body part and the second body part changes.

25. The mobile terminal of claim 24, wherein the first body part is a folder part, and the second body part is a main body part of the mobile terminal.

26. The mobile terminal of claim 20, wherein the first and second body parts are rotatably coupled about an axis of rotation, and wherein the camera is configured to move longitudinally along the axis of rotation as the first and second body parts rotate relative to one another.

27. The mobile terminal of claim 26, wherein the axis of rotation is substantially coincident with a central axis of the hinge part.

28. The mobile terminal of claim 26, wherein the camera is configured to extend outward from an outer circumferential side edge portion of the terminal when the first and second body parts are open relative to one another, and to be retracted into the terminal when the first and second body parts are closed relative to one another.

29. A method of operating a mobile terminal, comprising:
providing a body part;
rotatably coupling a folder part to the body part to move between an open and a closed position; and
retractably extending a camera outside the mobile terminal as the folder moves to the open position.

30. The method of claim 29, wherein the body part and the folder part are rotatably coupled about an axis of rotation, and wherein retractably extending a camera outside the mobile terminal as the folder moves to the open position comprises moving the camera longitudinally along the axis of rotation so as to extend the camera outside of the mobile terminal or to retract the camera into the mobile terminal as the body part and the folder part rotate relative to one another.

31. A mobile terminal, comprising:
a body part;
a folder part;
a hinge part that rotatably couples the body part and the folder part, wherein the folder part is configured to rotate relative to the body part about an axis of rotation disposed along the hinge part; and
a camera, wherein the camera is configured to selectively move longitudinally along the axis of rotation as the folder part rotates relative to the body part, wherein the camera comprises:
a camera module having a lens and an electronic circuit provided therein, wherein the camera module is configured to move as the folder part moves;
a camera shaft coupled to the camera module;
a pair of driving pins extending inward from one of an outer circumferential surface of the camera shaft or an inner circumferential surface of the hinge part; and
a corresponding pair of guide grooves formed on the other of the outer circumferential surface the camera shaft or the inner circumferential surface of the hinge part.

32. A mobile terminal, comprising:
a first body part;
a second body part, wherein the first and second body parts are rotatably coupled about an axis of rotation defined by a hinge part;
a camera holder disposed in the hinge part; and
a camera disposed in the camera holder, wherein the camera is configured to move longitudinally along the axis of rotation as the first and second body parts rotate relative to one another such that the camera is configured to extend outward from an outer circumferential side edge portion of the terminal when the first and second body parts are open relative to one another, and to be retracted into the terminal when the first and second body parts are closed relative to one another.

* * * * *